United States Patent
Holzel

[11] 3,994,562
[45] Nov. 30, 1976

[54] PROJECTION SCREEN

[76] Inventor: Thomas M. Holzel, 120 Riverside Drive, New York, N.Y. 10024

[22] Filed: July 18, 1975

[21] Appl. No.: 596,981

[52] U.S. Cl. .............................. 350/129; 82/14 R; 204/4
[51] Int. Cl.² ............... G03B 21/60; B22D 11/126; B23B 3/28
[58] Field of Search ............................ 350/117, 129

[56] References Cited
UNITED STATES PATENTS

| | | | |
|---|---|---|---|
| 2,804,801 | 9/1957 | Mihalakis | 350/129 |
| 2,984,152 | 5/1961 | Mihalakis | 350/129 |
| 3,809,457 | 5/1974 | Kurtz et al. | 350/129 X |

*Primary Examiner*—Richard A. Wintercorn
*Attorney, Agent, or Firm*—Charles E. Baxley

[57] ABSTRACT

A screen with characteristics of high brightness, controlled viewing angles, and ability to reject ambient light in which the longitudinal grooves formed therein are shaped so that the width and depth of each groove varies continuously along the length of the groove in a repeating sequence. The variation may take the form of a sine wave or be cuspoidal in shape.

A method of producing the screen uses a rotating roller in which desired grooves are cut. After the drum is cut with a series of grooves, a molding material is placed around the drum and baked. After removing the molding material from the drum, it is turned inside out and copied. This copy is again copied and its result is electroformed and thus serves as a master roller for the screen of the present invention.

8 Claims, 9 Drawing Figures

PROJECTION SCREEN

BACKGROUND OF THE INVENTION

The present invention relates to a movie screen or the like, and the production of the screen.

It has been long known that grooves cut vertically in a screen will cause light incident upon the screen to reflect horizontally in a pattern depending upon the shape of the grooves. This scattering by the grooves determines the reflectivity pattern and therefore, the viewing angle of the screen. It would, of course, be much more efficient to reflect the incident light rays in a vertical as well as a horizontal pattern. To this end, the prior art has coated the surface of the screen with a diffusing material that will cause sufficient vertical spread of the reflected light rays. The disadvantage, however, of these screens is the complete reliance of these diffusing materials which are highly inefficient as a light-spreading medium and which completely eliminates any screen's ability to reject ambient light falling on the screen outside its viewing area with a resulting serious loss of image contrast.

There have been attempts to free the screen designer from this unwanted dependence on diffusing materials. For example, U.S. Pat. Nos. 2,804,801 and 2,984,152 seek to avoid the use of diffusing materials by designing a screen having three-dimensionally protruding surfaces which reflect the incident light in the desired directions. However, the problem with these screens is that the protruding surfaces are extremely vulnerable to abrasion since their active reflecting surfaces extend outwardly from the screen to such a large degree. Therefore, the simple handling of these screens will result in the deterioration of their light reflecting qualities. Also, such protruding surfaces have not proven practical to manufacture with sufficient uniformity to be acceptable for use as a high brightness screen.

SUMMARY OF INVENTION

It is, therefore, the object of the present invention to provide a screen that is not dependent upon diffusing materials and which is not sensitive to abrasion and simple handling, while still exhibiting remarkable light reflecting ability.

It is also the object of the present invention to provide a method of producing the screen.

The screen of the present invention is formed with vertical grooves along its length. Each of these grooves is formed so that the depth and width of the grooves vary in a continuous and repeating fashion. This variation in depth and width is such that if curves were drawn along the midpoint of the groove and along a top edge of the groove, they would be sinusoidal or cuspoidal shaped.

The method of producing the screen of the present invention is achieved by cutting a series of parallel, approximately circular grooves in a wax master drum rotating at a desired rate. A cutter, which is approximately semi-circular shaped in vertical cross-section, cuts grooves in the master drum with a continuous in-and-out motion that is designed to produce a groove having the same depth and width variations as the designated grooves in the screen.

After the series of grooves are formed on the outside of the master drum, molding compound is placed around the drum, and baked. After sufficient amount of time for curing has passed, the molding compound is removed from the drum, and turned inside out so the copied grooves now face outward. This molding compound is copied again resulting in inside facing negative grooves. This second copy is electroformed in order to serve as the master roller for producing the screen of the present invention.

BRIEF DESCRIPTION OF INVENTION

These and further objects and advantages of the present invention will become more apparent upon reference to the following specification, appended claims, and drawings wherein:

DETAILED DESCRIPTION OF DRAWING

Figure 1:
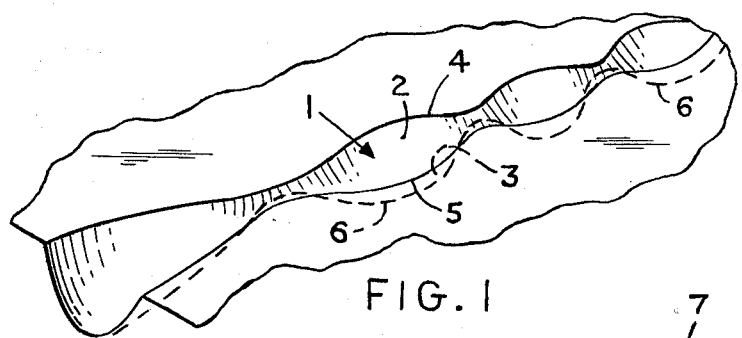
FIG. 1 is an enlarged perspective of the shape of one of the grooves in the screen of the present invention, in this case shown as circular.

Referring now to the drawings, there is illustrated the groove 1 of the present invention formed longitudinally in a screen. The screen comprises a series of these grooves on the surface thereof. The groove 1 has a pair of side walls 2, 3 which slope downwardly from the top edges 4 and 5, respectively, to the base 6 of the groove. The side walls 2, 3 slope downwardly toward each other so that the horizontal distance between corresponding points on the side walls lying in a horizontal plane increases as the vertical distance from the base to the horizontal plane cutting the groove increases. As can be seen in FIG. 1, the depth and width of the groove 1 continuously varies in a repeating fashion. This variation in the width of the groove is evident by the sinusoidal shape of the top edges 4, 5, the sinusoidal shape of top edge 4 being inverted in comparison to the sinusoidal shape of the top edge 5. Since the slope of both side walls 2 and 3 are generally semi-circular throughout the length thereof, and since the slope of the side wall 2 is equal to the slope of the side wall 3, the variation in the width of the groove is sinusoidal along the length thereof at any given vertical distance above the base 6.

The variation in the depth of the groove is determined by the sinusoidal shape of the base 6 in the longitudinal direction. That is, the contour of the base 6 of the groove 1 along the longitudinal axis is in the form of a sine wave. As can be seen in FIG. 1, when the depth of the groove is the greatest, the width of the groove is also the greatest, and when the depth of the groove is the smallest, the width of the groove is also the smallest.

Figure 2:
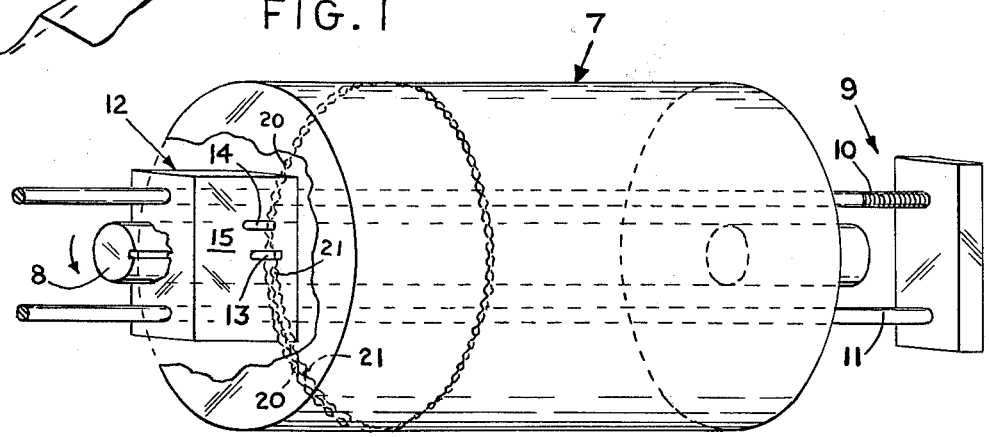
FIG. 2 is a perspective view of the master drum and cutting mechanism for the drum that is used in the method of producing the screen of the present invention.

Referring to FIG. 2, there is shown a master drum 7 made of wax, or the like. Master drum 7 is mounted for rotation and may be rotated in any conventional way, for example by an electric motor connected to shaft 8 of the drum. Mounted adjacent to the drum 7 and parallel therewith is a traversing mechanism 9 having traverse rods 10 and 11. Traverse rod 10 is in the form of a threaded screw and rod 11 a guide. Slidably mounted on these rods is a cutting head 12 having a cutting stylus 13 and tracing stylus 14 projecting from a side 15 of the head. Cutting head 12 is threadably engaged with the traverse rod 10 in the conventional way, so that upon rotation of the rod 10, the cutting head will move across the drum 7. Alternatively, the cutting head may be traversed across the drum by a piston-cylinder arrangement where the piston rod is fixedly connected to the cutting head.

Figure 3:
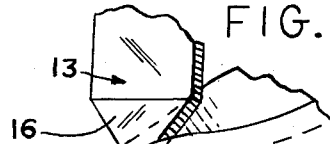
FIGS. 3 and 4 show the cutter at different points in time and position forming a groove in the master drum of the present invention.
Figure 4:
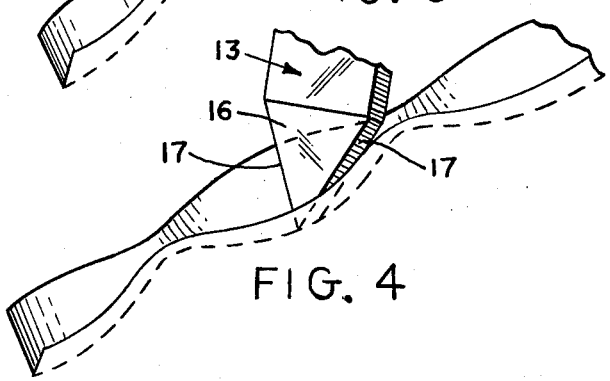

The cutting stylus 13, as shown in FIGS. 3 and 4, has a cutting end 16 of desired shaped cross-section with side surfaces 17 of constant width throughout the length thereof. Therefore, as the distance the cutting stylus 13 enters into the rotating master drum 7 varies, so does the depth and width of the groove formed vary. By selected oscillation of the cutting stylus 13 cutting into the drum 7, a groove having a sinusoidally varying width and depth may be attained. This can be seen with reference to FIGS. 3 and 4. In FIG. 3, the cutter stylus 13 is at its uppermost position of travel and therefore cuts the narrowest and shallowest portion of the groove 1. In FIG. 4, the cutting stylus is at its lowermost portion of travel and therefore cuts the broadest and deepest portion of the groove. By the continuous reciprocation of the cutter 13, a repeating pattern is formed having alternating maxima and minima of groove breadth and depth.

The cutting stylus 13 may be reciprocated within the cutting head 12 in any conventional way, for example, via a solenoid or record cutting head modified to oscillate in a vertical direction.

As shown in FIG. 2, a first circular groove 20 is formed in the master drum 7. The groove 20 is shaped in accordance with the reciprocation of the cutting stylus 13. This reciprocation is controlled so that its frequency and length of stroke will develop a groove of desired shape and such frequency in relation to the speed of rotation will insure a perfect transition of the last portion of the groove with the first portion.

Figure 9:
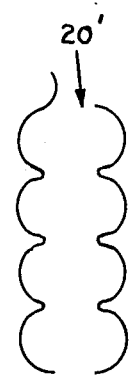
FIG. 9 is an exploded plan view of another shape of one of the grooves in the screen of the present invention.

It is important to note that the speed of travel of the cutting stylus 13 need not be uniform at every point along its stroke. Where it is uniform, the sinusoidally shaped groove shown in FIG. 1 is achieved. If, however, the speed at the top of the stroke is made greater than that at the bottom, a more cuspoidally shaped groove 20' will be formed, where the length of the narrower and shallower portions of the groove will be less than the length of the wider and deeper portions. This groove is shown in FIG. 9. Depending on what shaped groove is desired, a signal corresponding to the desired shape will be applied to the driving means of the cutting stylus.

After the first groove 20 has been formed in the master drum 7, the cutting head 12 is indexed to the right in FIG. 2 so that another groove may be cut. The cutting head is indexed by the traversing mechanism 9 a certain distance so that the tracing stylus 14 mounted to the left of and above the cutting stylus 13 is aligned with the first groove 20. This indexing is highly critical and may be performed by measuring the light waves of a laser beam reflecting off of a prism mounted on the cutting head, as is known in the art. The tracing stylus 14 is in the form of a photocell 30 (see FIG. 8) with a light emitting diode 31 and a photo diode 32 mounted therein, which is well-known in the art. As the photodiode 32 receives reflected light emitted from the light emitting diode 31 and reflected by the groove 20, any variation in the intensity of the reflected light will be sensed by the photo diode and a corresponding change in output from the photo diode 31 will result.

Figure 5:
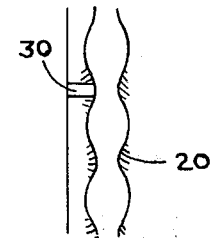
FIGS. 5 and 6 show the tracing Cds cell at different points in time and illustrating the positions which represent the minimum and maximum control signal for controlling the movement of the cutter of the present invention.
Figure 6:
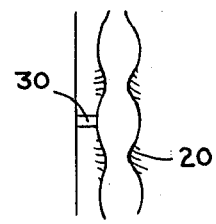

To see how the photo-cell 30 traces the cut of the first groove 20, reference is made to FIGS. 5 and 6. FIGS. 5 and 6 show a portion of the groove 20 with the photocell 30 above it. Since the master drum 7 is coated with black, a portion of a groove cut into the white wax drum will have a surface amount of white in direct proportion to the width and depth of the cut in that portion. Therefore, as shown in FIG. 5, when the narrowest and shallowest portion of the first groove 20 passes under the photocell 30, no light will be reflected back to the photo diode 32 and a minimum voltage will be produced by the photocell. On the other hand, when the widest and deepest portion of the groove 20 passes under the photocell 32, the maximum intensity of light will be received by the photo diode 32, and a corresponding maximum voltage will be produced. In between these two extremes, varying amounts of voltage will be produced in direct proportion to the amount of light reflected by the groove, and therefore the width and depth of the groove portions.

Figure 8:
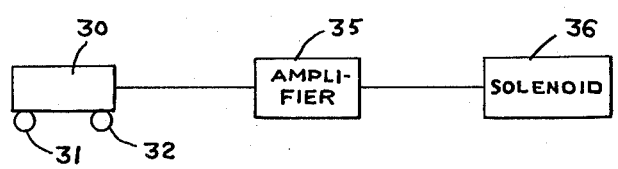
FIG. 8 shows the circuit connecting the tracing stylus with the cutter of the present invention.

As shown in FIG. 8, the output from the photo diode 32 is connected to the input of an amplifier 35, the output of which is connected to the solenoid 36, or the like, controlling the movement of the cutting stylus 13. Therefore, as the tracing stylus 14 moves over one of the narrowest and shallowest portions of the groove 20, a minimum current will be produced in the solenoid 36, and the cutting stylus 13 will be at the top of its stroke. Likewise, when the tracing stylus passes over one of the widest and deepest portions of the groove 20, the maximum voltage will be produced, and the cutting stylus 13 will be at the bottom of its stroke. Thus a second groove 21 in FIG. 2 is formed having the same shape as the first groove.

The tracing stylus of the present invention need not be restricted to a photocell, but may be a photographic play-back stylus.

Figure 7:
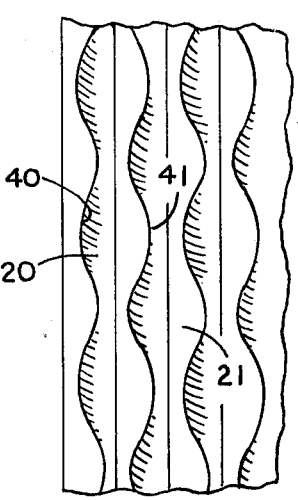
FIG. 7 shows the phase difference in the shape of adjacent grooves.

In order to make the light reflecting qualities of the screen optimal no flat spots may be left on the roller; therefore it has been found advantageous to make adjacent grooves 180° out of phase and utilize 100 percent overcut methods of grooving. This pattern is illustrated in FIG. 7, where the first groove has its widest and deepest portion 40 adjacent to the narrowest and shallowest portions 41 of the second groove 21. This improves light reflectivity since there are no flat spots in a screen as would be the case if the adjacent grooves were not exactly out of phase. Thus, only peaked ridge lines corresponding to the top edges of adjacent grooves separates the grooves from one another.

To accomplish this 180° shift in cutting of the next groove, the tracing stylus 14, as noted above, is mounted above the cutting stylus 13. The vertical distance between the two styli is equal to the distance between the adjacent narrowest and widest portions of the groove. In addition, the two styli are located on a line parallel to the axis of drum 7 although this is not shown in FIG. 2 for the sake of clarity. Thus, the 180° phase shift is assured.

By continually indexing the cutting head 12 and to the right in FIG. 2, a series of concentric grooves are cut along the entire length of the master drum 7 in the same way as groove 21 was formed.

After cutting the grooves in the master drum, the drum is covered with a molding compound such as RTV or Plastisol, and cured by baking. After sufficient curing, the wax master is removed by melting it. After turning this molding inside out, the grooves formed therein from the drum 7 become protuberances of similar but negative shape. After this eversion, the molding is again copied, and thus becomes an intermediary positive with the grooves on the inside of its cylindrical shape. This intermediary is electroformed to produce a roller with negative grooves on the outside. When used as an embossing tool it will produce positive grooves similar to those originally cut by the stylus. The embossed material is made reflective by a vacuum deposit of aluminum and other materials on its front surface. Other manufacturing processes may be used to produce the screen material from the roller such as extrusion casting, curtain coating, etc.

The screen produced from the method of the present invention exhibits a high degree of light reflectivity since light rays incident upon the screen are reflected in controlled horizontal and vertical directions. The precise horizontal reflection pattern is achieved by the shape of the sloping side walls of the grooves, and the precise vertical reflection by the sloping, or continually changing, base of the groove.

It is also in the purview of the present invention that grooves having shapes other than sinusoidal and cuspoidal be formed. Further, the distance between like portions of width and depth may be adjusted by the speed of rotation of the master drum 7, and the contour of the groove may be altered by using a cutting stylus 13 having a different shape, for example, parabolic or circular.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come about within the meaning and range of equivalency of the claims are therefore intended to be embraced therein.

I claim:

1. In a screen, the improvement comprising a series of longitudinally parallel grooves formed therein, each of said grooves comprising a first downwardly curving side wall having a top edge and a bottom surface; a second downwardly tapering side wall having a top and a bottom edge; a base; the bottom surface of said first side wall meeting the bottom surface of said second side wall defining the boundaries of said base; the horizontal distance between said top edge of said first side wall and said top edge of said second side wall varying continuously between a minimum and a maximum along the longitudinal direction of said groove; and the vertical distance between said base and one of said top edges of said first and second side walls varying continuously along the longitudinal direction of said groove between a minimum and a maximum; the maximum distance between said base and one of said top edges occurring at the same position in the groove as the maximum horizontal distance between said top edges, said entire surface being made highly reflective whereby light incident thereon is reflected in the desired horizontal and vertical direction.

2. The screen according to claim 1, wherein each of said top edges defines a sinusoidally shaped contour along the length of the groove, the sinusoidally shaped contour of one top edge being inverted with respect to the sinusoidally shaped contour of the other top edge.

3. The screen according to claim 2, wherein each of said side walls has equally sloped surfaces.

4. The screen according to claim 1, wherein a center line of said base defines a sinusoidally shaped contour along the longitudinal direction thereof.

5. The screen according to claim 1, wherein the horizontal distance between said top edges continuously increases from a minimum to a maximum, and then continuously decreases from a maximum to a minimum, said increases and decreases occurring in an altering sequence along the length of said groove.

6. The screen according to claim 5, wherein the distance between base and one of said top edges continuously increases from a minimum to a maximum, and then continuously decreases from a maximum to a minimum, said increases and decreases occurring in an alternating sequence along the length of said groove.

7. The screen according to claim 1, wherein each of said top edges defines a cuspoidally shaped contour along the length of the groove, the cuspoidally shaped contour of one edge being inverted with respect to the cuspoidally shaped contour of the other top edge, and a center line of said base defines a cuspoidally shaped contour along the longitudinal direction thereof.

8. The screen according to claim 1, wherein the maximum horizontal distance between said top edges in one groove corresponds with a minimum horizontal distance between said top edges in an immediately adjacent groove, and the maximum distance between said base and one of said top edges corresponds with the minimum distance between said base and one of said top edges in said immediately adjacent groove.

* * * * *